(12) United States Patent
Baldwin (10) Patent No.: US 11,159,005 B1
(45) Date of Patent: Oct. 26, 2021

(54) ELECTRICAL BOX ASSEMBLY WITH AN ADJUSTABLE VOLTAGE DIVIDER

(71) Applicant: Jeffrey P. Baldwin, Anthem, AZ (US)

(72) Inventor: Jeffrey P. Baldwin, Anthem, AZ (US)

( * ) Notice: Subject to any disclaimer, the term of this patent is extended or adjusted under 35 U.S.C. 154(b) by 48 days.

(21) Appl. No.: 16/698,664

(22) Filed: Nov. 27, 2019

Related U.S. Application Data (60) Provisional application No. 62/772,110, filed on Nov. 28, 2018.

(51) Int. Cl.
*H02G 3/18* (2006.01)
*H02G 3/08* (2006.01)
*H02G 3/14* (2006.01)

(52) U.S. Cl.
CPC .............. *H02G 3/185* (2013.01); *H02G 3/081* (2013.01); *H02G 3/14* (2013.01)

(58) Field of Classification Search
CPC .......... H02G 3/08; H02G 3/185; H02G 3/081; H02G 3/12
See application file for complete search history.

(56) References Cited

U.S. PATENT DOCUMENTS

| 5,671,531 | A | * | 9/1997 | Mugiya | ............... | H01L 21/4853 |
| | | | | | | 257/E21.525 |
| 5,783,774 | A | * | 7/1998 | Bowman | ................ | H02G 3/185 |
| | | | | | | 174/482 |
| 8,921,712 | B1 | * | 12/2014 | Gretz | ....................... | H02G 3/14 |
| | | | | | | 174/487 |
| 2015/0171572 | A1 | * | 6/2015 | Carbone | .............. | H01R 13/748 |
| | | | | | | 439/538 |
| 2020/0036174 | A1 | * | 1/2020 | Diakomis | ................ | H02G 3/14 |

* cited by examiner

*Primary Examiner* — Hoa C Nguyen
*Assistant Examiner* — Amol H Patel
(74) *Attorney, Agent, or Firm* — Booth Udall Fuller, PLC; Kenneth C. Booth (57) ABSTRACT

An electrical box comprising an adjustable voltage divider may include a housing comprising an inner surface and ribs or threads integrally formed on the inner surface of the rectangular housing. A voltage divider plate may be disposed within the housing with vertical edges of the voltage divider plate extending along and held in place between the ribs or threads integrally formed on the inner surface of the housing, the voltage divider plate dividing the housing into a high voltage area and a low voltage area. The voltage divider plate area may comprise a plurality of horizontal guide lines vertically offset from each other, and a plurality of vertical guide lines horizontally offset from each other and intersecting the plurality of horizontal score lines. Upper outer corners of the voltage divider plate may be inwardly disposed from the vertical edges of the voltage divider plate.

14 Claims, 10 Drawing Sheets

ELECTRICAL BOX ASSEMBLY WITH AN ADJUSTABLE VOLTAGE DIVIDER

CROSS REFERENCE TO RELATED APPLICATIONS

This application claims the benefit of the filing date of U.S. Provisional Patent Application 62/772,110 entitled "Horizontal Surface Enclosures" to Jeffrey P. Baldwin that was filed on Nov. 28, 2018, the disclosure of which is hereby incorporated herein by this reference.

TECHNICAL FIELD

Aspects of this document relate generally to an electrical box assembly comprising an adjustable voltage divider.

BACKGROUND

Electrical box assemblies, boxes or housings are used as an area for aggregating electrical wiring, cable, optical fibers, conduit, or other transmission lines for electrical, data, communication, security, and other transmission line. At times different types of transmission lines may be brought together in adjacent boxes or in a single box.

SUMMARY

Aspects of this document relate to an electrical box assembly comprising an adjustable voltage divider, which may comprise a cylindrical housing comprising an inner surface and an outer surface opposite the inner surface. A voltage divider plate may be disposed within the cylindrical housing with vertical edges of the voltage divider plate extending along the inner surface of the cylindrical housing. The voltage divider plate may divide the cylindrical housing into a high voltage area and a low voltage area. The voltage divider plate may comprise a plurality of horizontal score lines formed as grooves comprising v-shaped cross-sectional areas. The plurality of horizontal score lines may be vertically offset from each other. The voltage divider plate may comprise a plurality of vertical score lines may be formed as grooves comprising v-shaped cross-sectional areas, the plurality of vertical score lines being horizontally offset from each other and intersecting the plurality of horizontal score lines. Upper outer corners of the voltage divider plate may be inwardly disposed from the vertical edges of the voltage divider plate.

Particular embodiments may comprise one or more of the following features. The inner surface of the cylindrical housing may comprise a threaded inner surface, the threaded inner surface comprising inclined threads arranged as at least two columns of vertically spaced threads separated by at least two horizontal gaps between the at least two columns of vertically spaced threads. The vertical edges of the voltage divider plate may extend along the at least two horizontal gaps. A mounting frame may be rotatably coupled to the threaded inner surface of the housing to adjustably position the mounting frame within the housing. The mounting frame may comprise an outer disk comprising an edge mateably coupled with the threaded inner surface and an opening through the outer disk inwardly disposed form the edge of the outer disk. The upper outer corners of the voltage divider plate may be disposed through the opening of the mounting frame outer disk. A floor electrical receptacle may be coupled to the cylindrical housing. Ribs may be integrally coupled to the cylindrical housing and vertical edges of the voltage divider plate may extend along and be held in place between the ribs. The intersecting of the vertical score lines with the horizontal score lines may form three columns of detachable bars, two outer columns of detachable bars with each of the two outer columns comprising a first width and an of detachable bars disposed between the two outer columns, the of detachable bars comprising a second width greater than the first width. The plurality of horizontal score lines and the plurality of vertical score lines may be formed as a scoring pattern on a front surface of the voltage divider plate, the scoring pattern also being formed on a back surface of the voltage divider plate opposite the front surface. The scoring pattern on the front surface may be aligned with the scoring pattern on the back surface.

In some instances, an electrical box assembly comprising an adjustable voltage divider may comprise a rectangular housing comprising an inner surface and ribs integrally formed on the inner surface of the rectangular housing. A voltage divider plate may be disposed within the rectangular housing with vertical edges of the voltage divider plate extending along and held in place between the ribs integrally formed on the inner surface of the rectangular housing. The voltage divider plate may divide the rectangular housing into a high voltage area and a low voltage area. The voltage divider plate may comprise a plurality of horizontal score lines formed as grooves, the plurality of horizontal score lines being vertically offset from each other. The voltage divider plate may comprise a plurality of vertical score lines formed as grooves, the plurality of vertical score lines being horizontally offset from each other and intersecting the plurality of horizontal score lines. Upper outer corners of the voltage divider plate being inwardly disposed from the vertical edges of the voltage divider plate.

Particular embodiments may comprise one or more of the following features. The grooves of the horizontal score lines and the vertical score lines may comprise a v-shaped cross-sectional area. The intersecting of the vertical score lines with the horizontal score lines may form three columns of detachable bars, two outer columns of detachable bars with each of the two outer columns comprising a first width and an inner column of detachable bars disposed between the two outer columns, the inner column of detachable bars comprising a second width greater than the first width. The plurality of horizontal score lines and the plurality of vertical score lines may be formed as a scoring pattern on a first surface of the voltage divider plate, the scoring pattern also being formed on a second surface of the voltage divider plate opposite the first surface, the scoring pattern on the first surface being aligned with the scoring pattern on the second surface. A floor electrical receptacle may be coupled to the rectangular housing.

In some instances, an electrical box assembly comprising an adjustable voltage divider may comprise a housing comprising an inner surface and ribs integrally formed on the inner surface of the housing. A voltage divider plate may be disposed within the housing with vertical edges of the voltage divider plate extending along, and held in place between, the ribs integrally formed on the inner surface of the housing. The voltage divider plate may divide the housing into a high voltage area and a low voltage area. The voltage divider plate may comprise a plurality of horizontal guide lines vertically offset from each other. The voltage divider plate may comprise a plurality of vertical guide lines horizontally offset from each other and intersect the plurality of horizontal score lines. Upper outer corners of the voltage divider plate may be inwardly disposed from the vertical edges of the voltage divider plate.

Particular embodiments may comprise one or more of the following features. The horizontal guide lines and the vertical guide lines may be formed as score lines comprising a groove formed in the voltage divider plate configured to facilitate breaking of the voltage divider plate along the score lines. The score lines may be formed comprising a v-shaped cross-sectional area. The intersecting of the vertical score lines with the horizontal score lines may form three columns of detachable bars, two outer columns of detachable bars with each of the two outer columns comprising a first width and an inner column of detachable bars disposed between the two outer columns, the inner column of detachable bars comprising a second width greater than the first width. The plurality of horizontal score lines and the plurality of vertical score lines may be formed as a scoring pattern on a first surface of the voltage divider plate, the scoring pattern also being formed on a second surface of the voltage divider plate opposite the first surface. The scoring pattern on the first surface may be aligned with the scoring pattern on the second surface. A floor electrical receptacle may be coupled to the housing.

The foregoing and other aspects, features, applications, and advantages will be apparent to those of ordinary skill in the art from the specification, drawings, and the claims. Unless specifically noted, it is intended that the words and phrases in the specification and the claims be given their plain, ordinary, and accustomed meaning to those of ordinary skill in the applicable arts. The inventors are fully aware that he can be his own lexicographer if desired. The inventors expressly elect, as their own lexicographers, to use only the plain and ordinary meaning of terms in the specification and claims unless they clearly state otherwise and then further, expressly set forth the "special" definition of that term and explain how it differs from the plain and ordinary meaning. Absent such clear statements of intent to apply a "special" definition, it is the inventors' intent and desire that the simple, plain and ordinary meaning to the terms be applied to the interpretation of the specification and claims.

The inventors are also aware of the normal precepts of English grammar. Thus, if a noun, term, or phrase is intended to be further characterized, specified, or narrowed in some way, then such noun, term, or phrase will expressly include additional adjectives, descriptive terms, or other modifiers in accordance with the normal precepts of English grammar. Absent the use of such adjectives, descriptive terms, or modifiers, it is the intent that such nouns, terms, or phrases be given their plain, and ordinary English meaning to those skilled in the applicable arts as set forth above.

Further, the inventors are fully informed of the standards and application of the special provisions of 35 U.S.C. § 112(f). Thus, the use of the words "function," "means" or "step" in the Detailed Description or Description of the Drawings or claims is not intended to somehow indicate a desire to invoke the special provisions of 35 U.S.C. § 112(f), to define the invention. To the contrary, if the provisions of 35 U.S.C. § 112(f) are sought to be invoked to define the inventions, the claims will specifically and expressly state the exact phrases "means for" or "step for", and will also recite the word "function" (i.e., will state "means for performing the function of [insert function]"), without also reciting in such phrases any structure, material or act in support of the function. Thus, even when the claims recite a "means for performing the function of . . . " or "step for performing the function of . . . ," if the claims also recite any structure, material or acts in support of that means or step, or that perform the recited function, then it is the clear intention of the inventors not to invoke the provisions of 35 U.S.C. § 112(f). Moreover, even if the provisions of 35 U.S.C. § 112(f) are invoked to define the claimed aspects, it is intended that these aspects not be limited only to the specific structure, material or acts that are described in the preferred embodiments, but in addition, include any and all structures, materials or acts that perform the claimed function as described in alternative embodiments or forms of the disclosure, or that are well known present or later-developed, equivalent structures, material or acts for performing the claimed function.

The foregoing and other aspects, features, and advantages will be apparent to those of ordinary skill in the art from the specification, drawings, and the claims.

BRIEF DESCRIPTION OF THE DRAWINGS

Implementations will hereinafter be described in conjunction with the appended drawings, where like designations denote like elements, and.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of implementations.

DETAILED DESCRIPTION

This document features an electrical box assembly comprising an adjustable voltage divider. There are many features of an electrical box assembly comprising an adjustable voltage divider and implementations disclosed herein, of which one, a plurality, or all features or steps may be used in any particular implementation.

In the following description, reference is made to the accompanying drawings which form a part hereof, and which show by way of illustration possible implementations. It is to be understood that other implementations may be utilized, and structural, as well as procedural, changes may be made without departing from the scope of this document. As a matter of convenience, various components will be described using exemplary materials, sizes, shapes, dimensions, and the like. However, this document is not limited to the stated examples and other configurations are possible and within the teachings of the present disclosure. As will become apparent, changes may be made in the function and/or arrangement of any of the elements described in the disclosed exemplary implementations without departing from the spirit and scope of this disclosure.

Figure 1:
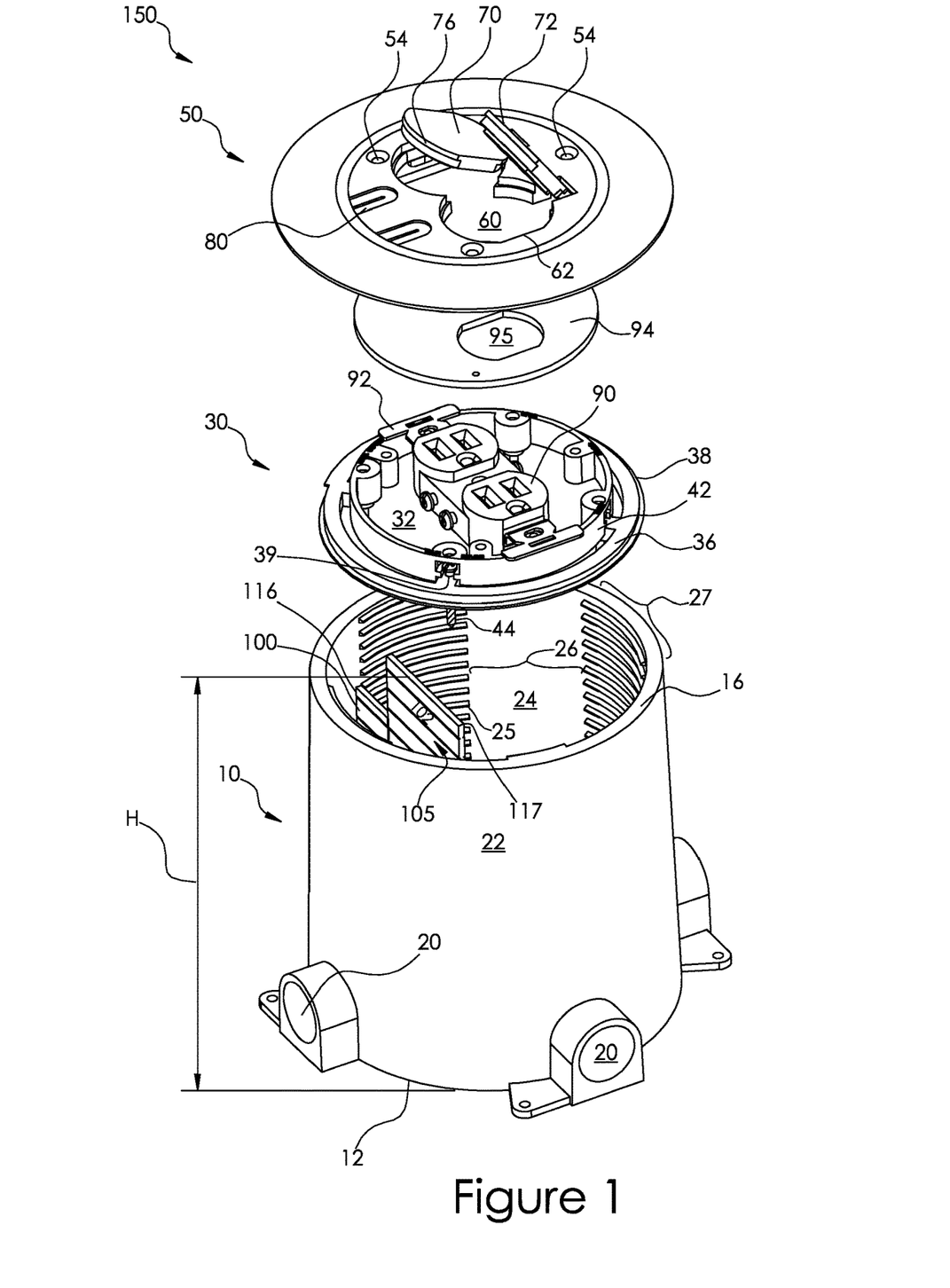
FIG. 1 depicts an exploded perspective view of an electrical box or housing with a voltage divider.

FIG. 1 depicts an exploded perspective view of a non-limiting implementation of an assembly, electrical box comprising an adjustable voltage divider, or box assembly with voltage divider 150. The assembly 150 may comprise a cylindrical housing, housing, or electrical box 10 that may be formed of concrete, reinforced concrete, cement, plastic, fiberglass, resin, metal, or any other suitable material that provides structural support. While the housing may comprise a circular, or rounded cross-sectional shape in plan view, any other desirable shape may also be used. The housing 10 comprises a lower end, edge, or base 12 that may be disposed on supporting surface, subfloor, or floor, such as dirt, an aggregate base course (ABC), concrete, wood, stone, earth, or any other similar or suitable material. The housing 10 also comprises an upper end, edge, or base 16 opposite the lower end 12. The upper end 16 may be disposed at a level of a finished floor or a subfloor 18. A height H of the housing 10 extends between the lower end 12 and the upper end 16.

In some instances, the lower end 12 may rest on a supporting surface like ABC, before a concrete floor or subfloor is poured around the housing 10. After the housing 10 is positioned at a desired location, conduit, tubing, or wiring can be extended to and coupled with the openings or conduit access points 20. After coupling the conduit to the housing 10, the concrete floor 18 can be poured in around the housing 10 and over the conduit and the supporting surface 14. In some instances, when the height H of the housing 10 positions the upper end 16 above the level, elevation, or finish floor height of the finished floor or subfloor 18, the upper end 16 can be cut down or reduced to a lower height or lesser height H' so as to form an upper end 16 at a height or elevation less than an original height.

The housing 10 also comprises an outer surface 22 and a threaded inner surface or inner surface 24 opposite the outer surface 22. The inner surface 24 comprises threads or ribs 25 formed as inclined ridges, channels, or grooves that may be continuous or intermittent. When the threads 25 are formed intermittently, there may be spaces, gaps, or horizontal gaps 26 formed horizontally between columns 27 of stacked threads 25, as shown, e.g., in FIGS. 1 and 2. When the threads 25 are formed continuously, there may be no spaces or gaps 26, the threads continuing unbrokenly, such as in a continuous or unbroken spiral or helix, along the inner surface 24. In either case, the threads 25 may be angled or inclined along the threaded inner surface 24 of the housing 10. The threads 25 formed on the threaded inner surface 24 comprise a first threading spacing or first spacing S1. The first threading spacing S1 may be in a range of 2-20 millimeters, 3-10 mm, or thereabout or substantially so, wherein "about" or "substantially" means less than or equal to a percent difference of 50% or less, 40% or less, 30% or less, 20% or less, 10% or less, 5% or less, 3% or less, or 1% or less.

A mounting frame or leveling ring 30 may be formed of plastic, metal, fiber, ceramic, composite, or other suitable material that provides for rigid structural support for the coupling of the floor electrical receptacle 90 to the housing 10. The mounting frame 30 may be rotatably coupled to the threaded inner surface 24 of the cylindrical housing 10 and configured to adjustably position the mounting frame 30 within the cylindrical housing 10. The mounting frame 30 may comprise an outer disk or first portion 36 and a yoke support or second portion 42. The mounting frame 30 may comprise one or more mounting flanges, tabs, or protuberances 33, as well as opening 32 in the mounting frame 30, each of which may contact, be coupled with, and support a subsequently mounted voltage divider 100 within the housing 10.

The outer disk 36 may comprise an outer edge 38 mateably coupled with the threaded inner surface 24. The outer disk 36 may also comprise at least one threaded opening 39 (such as at least three threaded openings 39) or any suitable number of threaded openings 39. The threaded openings 39 extend vertically through the outer disk 36, and comprise a second threading spacing S2 less than the first threading spacing S1. The threaded openings 39 may be internally threaded.

The yoke support 42 comprises at least one threaded fastener 44 (such as at least three threaded fasteners 44) or any suitable number of threaded fasteners 44, extending from the yoke support 42 to the threaded openings 39 in the outer disk 36. The floor electrical receptacle 90 may be coupled to a receptacle yoke 92 and may be further coupled to the yoke support or second portion of the mounting frame 42 of the mounting frame 30. The threaded fasteners 44 may comprise the second threading spacing S2, and the threaded fasteners 44 may be coupled to the threaded openings 39 to adjustably position the yoke support 42 with respect to the outer disk 36.

A outlet cover or floor electrical receptacle cover or base 50 may be disposed over the floor electrical receptacle 90 and coupled to the mounting frame 30 with an opening 60 in the outlet cover with perimeter 62 of the opening 50 aligned with the electrical receptacle 90. The outlet cover 50 may be coupled with the floor electrical receptacle 90 or receptacle yoke 92 through mounting holes 54 and fasteners, such as screws, inserted at the mounting holes 54.

The opening 60 and the floor electrical outlet cover 50 may be aligned with the floor electrical receptacle 90 to allow the electrical receptacle 90 to be accessed and electrically coupled to power cords and various devices even when the electrical outlet cover 50 is coupled to the floor electrical receptacle 90. The floor electrical outlet cover 50 may also comprise at least one hinged flap, flap, or closure plug 70 hingedly coupled to the floor electrical outlet cover 50, the hinged flap 70 configured to move from a closed position that restricts access to the floor electrical outlet to an open position that provides access to the floor electrical receptacle 90.

A fastener 80 may be disposed adjacent the hinged flap 70, the fastener 80 configured to move from a closed position that restricts opening the hinged flap 70, to an open position that allows for unrestricted opening of the hinged flap 70. The fastener 80 may comprise a freely-rotating piece, a spring-loaded latch, a sliding button, or any other suitable or desirable structure for allowing for, or restricting, the opening of the hinged flap 70. The fastener 80 may comprise a rounded head and a straight edge along a portion of a perimeter of the rounded head. The flap 70, whether hinged or not, may comprise a perimeter 72 and a lip, ridge, flange, or protuberance 76 formed along, or adjacent, the perimeter 72.

The floor electrical outlet cover 50 may be coupled to the floor electrical receptacle 90 with a gasket 94 disposed between the floor electrical outlet cover 50 and the floor electrical receptacle 90 such that the floor electrical outlet cover 50 passes a water scrub test. In other words, the gasket may provide sufficient friction against the floor electrical outlet cover 50 or between the floor electrical outlet cover 50 and the floor electrical receptacle 90, so as to limit or reduce an amount of water that may pass from outside the floor electrical outlet cover 50 to the floor electrical receptacle 90. The gasket 94 may be formed of foam, rubber, polymer, or any other suitable material that is resilient, compliant, or elastically deformable. The gasket 94 may also comprise at least one opening 95 formed through the gasket 94 and aligned with the at least one opening 60, and the floor electrical receptacle 90. As used herein, the floor electrical receptacle 90 comprises not only a high voltage electrical socket, but in some instances may also comprise a wiring device, which includes low voltage applications, such as applications for cables, transmission lines, wiring, connecters, switches, for coaxial cables, phone lines, ethernet cables, and USB devices.

The electrical box or assembly comprising an adjustable voltage divider 150 may also comprise a voltage divider plate 100 disposed within the cylindrical housing 10. The voltage divider plate 100 comprises a front side or first side 102 and a back side or second side 104 opposite the front side 102. The voltage divider plate 100 also comprises vertical edges 116 that extend between, and along, the front side 102 and the back side 104. As depicted in FIG. 1, the voltage divider plate may also extend along the one (or two) or more horizontal gaps 26, the voltage divider plate 100 dividing the cylindrical housing 10 into a high voltage area 105 and a low voltage area 106. Additional detail of the voltage divider plate 100 is also shown throughout the figures, such as in FIGS. 4A and 4B, which provide enlarged views of the voltage divider plate 100.

The voltage divider plate 100 may comprise a plurality of score lines or guide lines 110 that may indicate suitable locations at which the voltage divider plate may be divided, partitioned, broken, segmented, cut, clipped, sheared, or sawn. In some instances, the score lines or guide lines 110 will provide merely a visual reference as to where the voltage divider plate 100 may be advantageously divided, while in other instances the score lines 110 will structurally weaken the voltage divider plate 100 so as to facilitate breaking, cracking, shearing, separation, or division of the voltage divider plate 100 along the score line 110 to facilitate or provide for a good or improved fit of the voltage divider plate 100 within the assembly 150.

The voltage divider plate 100 may comprise a plurality of horizontal score lines 110*h* formed as grooves comprising v-shaped cross-sectional areas, the plurality of horizontal score lines 110*h* being vertically offset or comprising a vertical offset Ov from each other. A plurality of vertical score lines 110*v* may be formed as grooves comprising a v-shaped cross-sectional area, the plurality of vertical score lines 110*v* being horizontally offset or comprising a horizontal offset Oh from each other and intersecting the plurality of horizontal score lines 110*h* at intersections 114.

Figure 5:
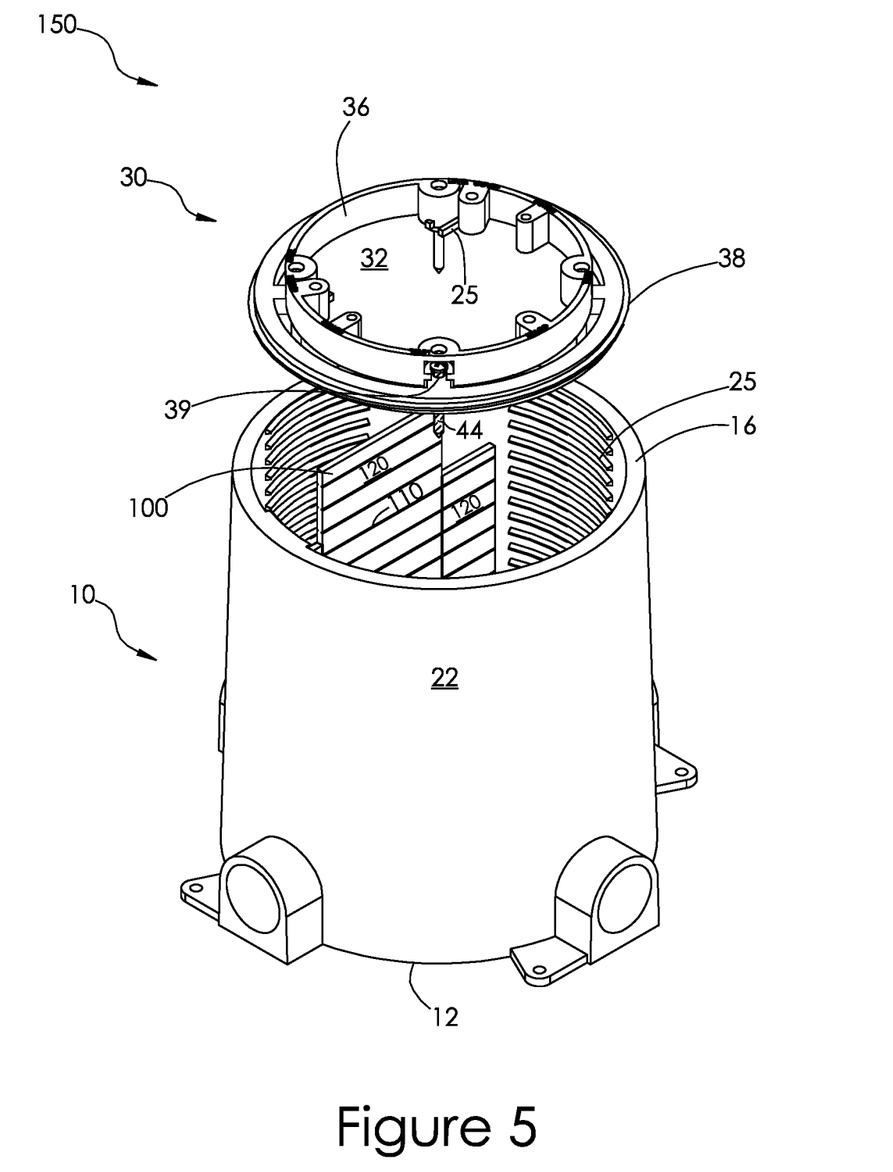
FIG. 5 shows a perspective view of the electrical box or housing with the voltage divider disposed therein and a mounting frame disposed thereover.
Figure 6:
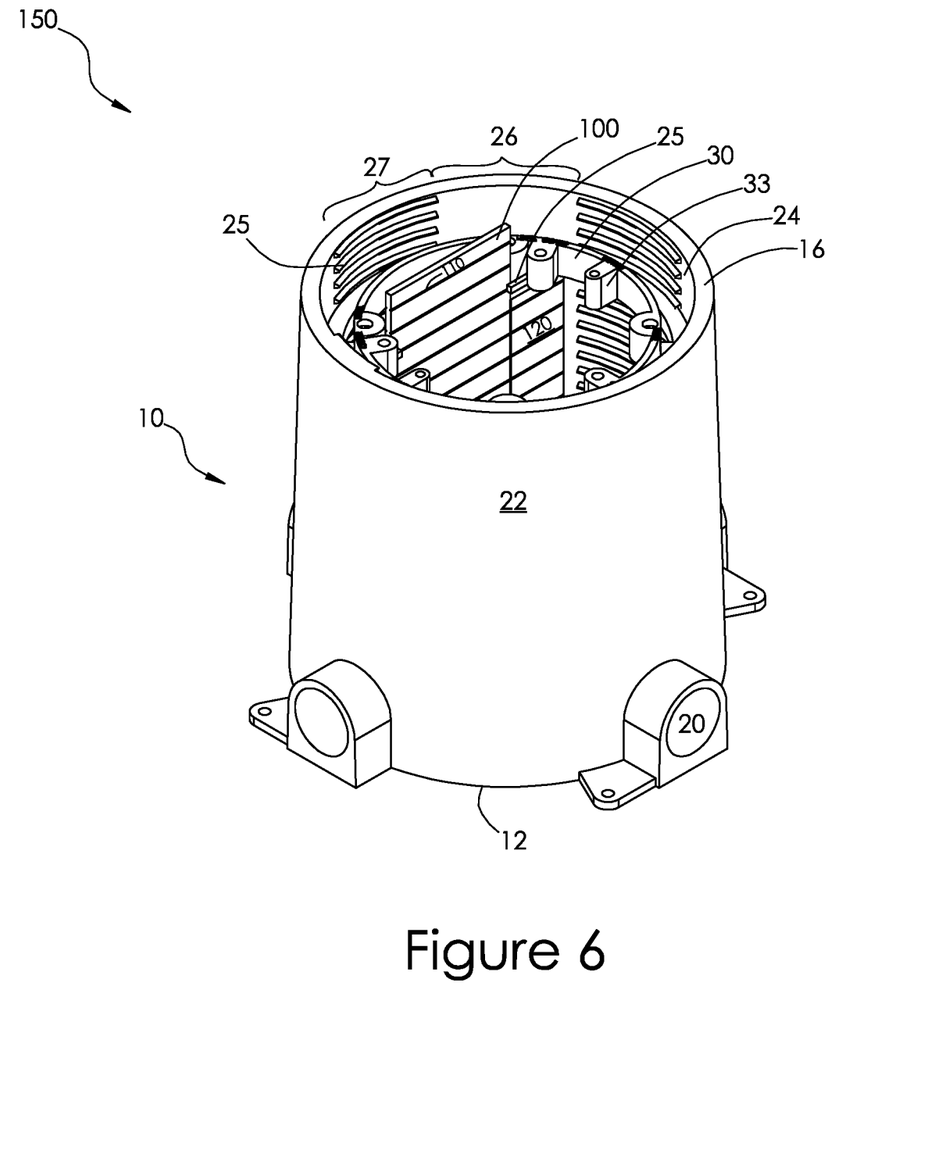
FIG. 6 shows the assembly of FIG. 5, but with the mounting frame disposed within the electrical box or housing.
Figure 8:
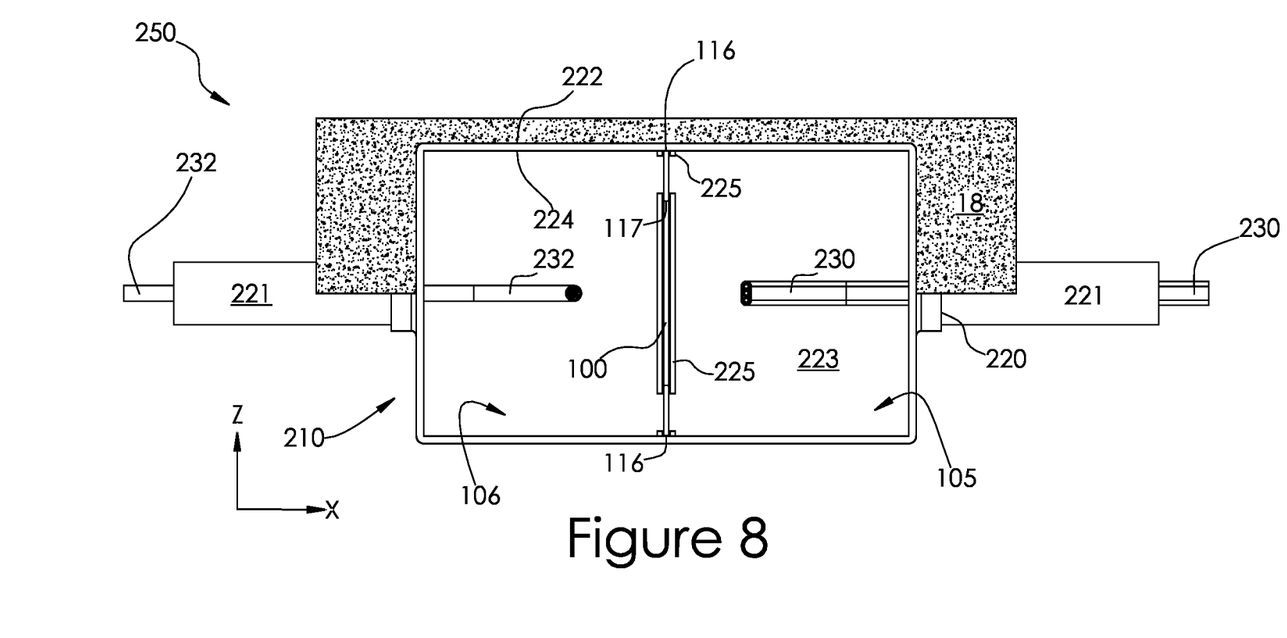
FIG. 8 depicts plan view of the electrical box or housing of FIG. 7.

The voltage divider plate 100 may comprise upper outer corners 117 that are inwardly disposed from the vertical edges 116 of the voltage divider plate 110, the upper outer corners 117 being disposed through an opening 32 of the mounting frame 30 or the mounting frame outer disk 36, as depicted, e.g., in FIGS. 1, 5, and 6, which may assist in securing the voltage divider plate 100 within the housing 10, whether alone, or with threads or ribs 25, mounting frame 30, or both. In some instances, ribs 25 may be integrally coupled to the housing 10 and vertical edges 116 of the voltage divider plate 110 may extend along, and be held in place between the ribs 25. Another similar example is shown in FIG. 8, where the voltage divider plate 110 extends along, and be held in place between the ribs 225.

Figure 4A:
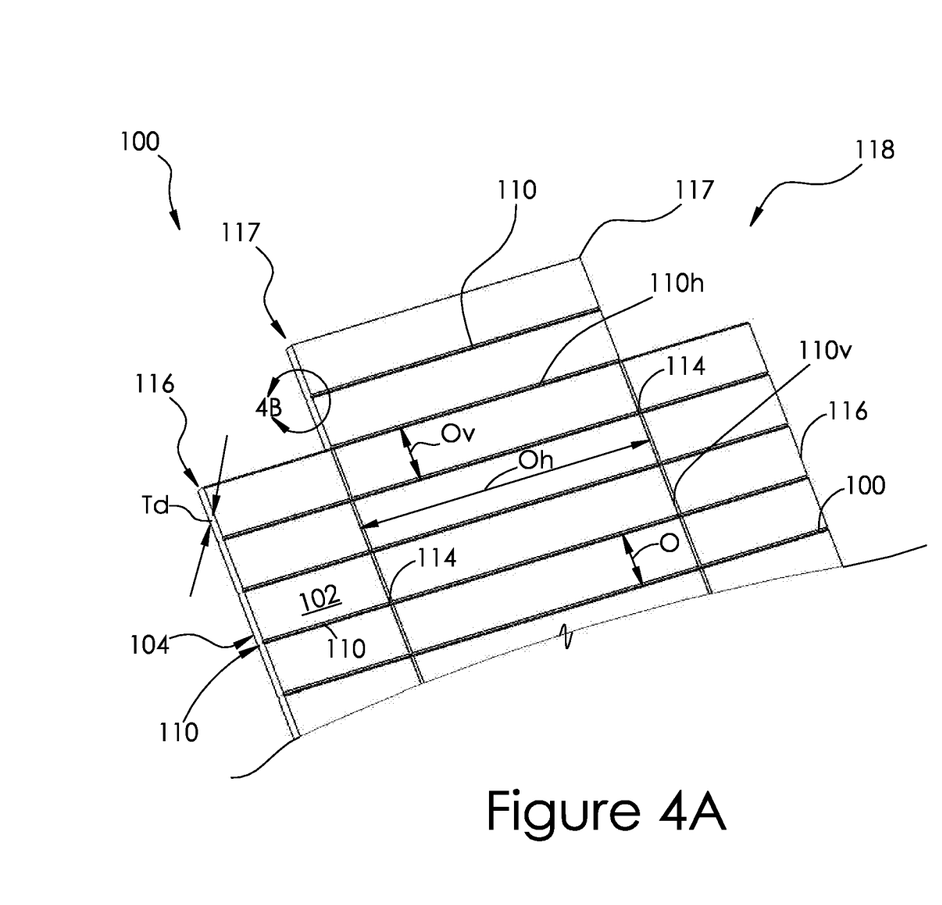
FIGS. 4A and 4B depict various close-up views of the voltage divider 100.

FIG. 1, as well as FIG. 4A and other figures, also depict how the assembly 150 may be arranged with the voltage divider plate 110 comprising intersections 114 of the vertical score lines 110*v* with the horizontal score lines 110*h* forming a desirable number of columns, such as three columns, of detachable bars 120. In some instances, the detachable bars 120 may be arranged in, or formed as, two outer columns 122 of detachable bars 120 with each of the two outer columns 122 comprising a first width W1 and an inner column 124 disposed between the two outer columns 122, the inner column 124 of detachable bars 120 comprising a second width W2 greater than the first width W1. The plurality of horizontal score lines 110*h* and the plurality of vertical score lines 110*v* form, or are formed as, a scoring pattern 126 that may be disposed or formed on the front surface 102 of the voltage divider plate 100, the back surface 104 of the voltage divider plate 100, or both. When the scoring pattern 126 is formed on both the front surface 102 and the opposing back surface 104, the scoring patterns 126 on opposing surfaces of the voltage divider plate may be aligned with each other.

Figure 2:
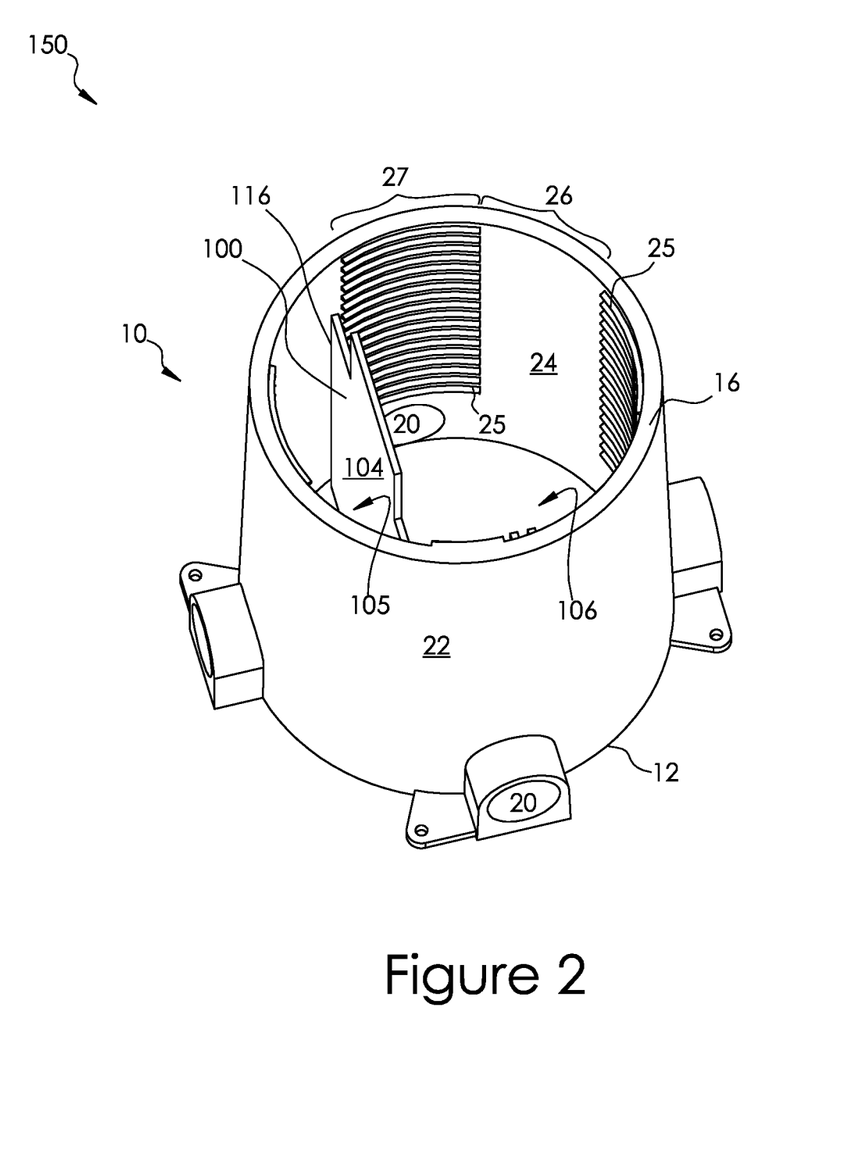
FIG. 2 depicts another perspective view that provides a close-up view of the electrical box or housing with the voltage divider disposed therein.

FIG. 2 depicts another perspective view that provides a close-up view of the electrical box or housing 10 with the voltage divider 100 disposed therein. FIG. 2 differs from FIG. 1 by not including the outlet cover 50, the gasket 94, and the mounting frame 30. FIG. 2 also shows the back side or back surface 104 of the voltage divider 100 without score lines or guide lines 110.

Figure 3A:
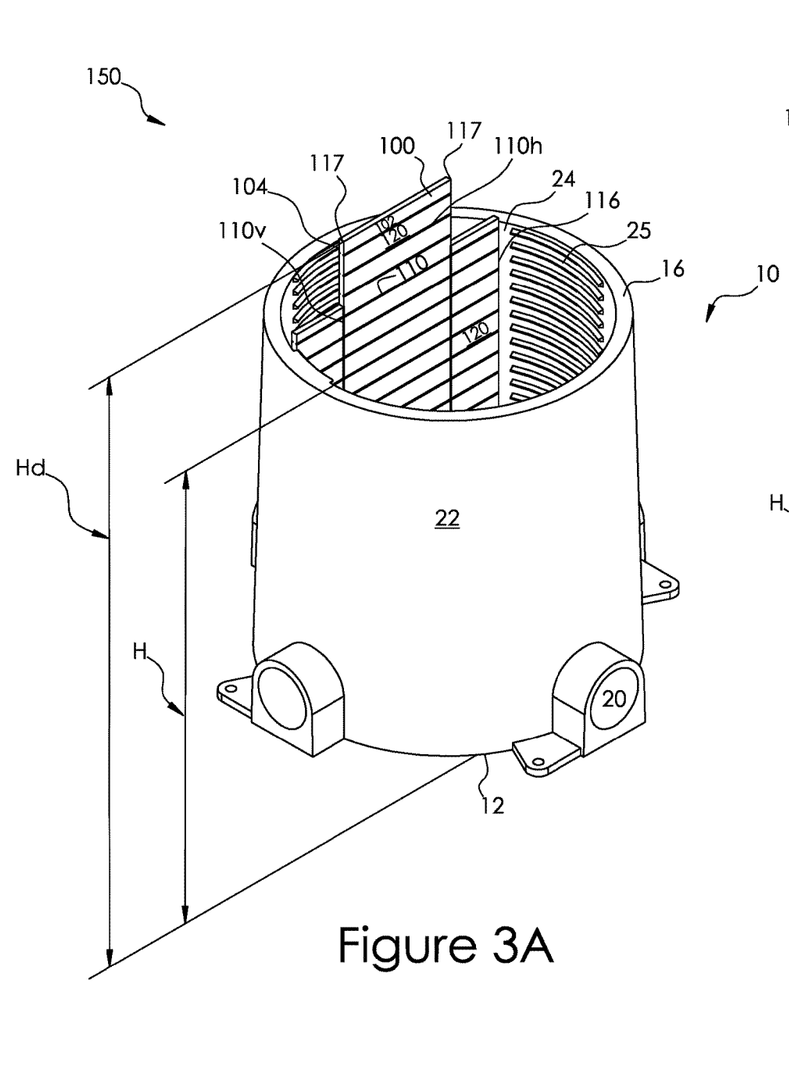
FIGS. 3A and 3B depict another perspective view of the electrical box or housing with the voltage divider disposed therein, the voltage divider shown at a first height and a second height.
Figure 3B:
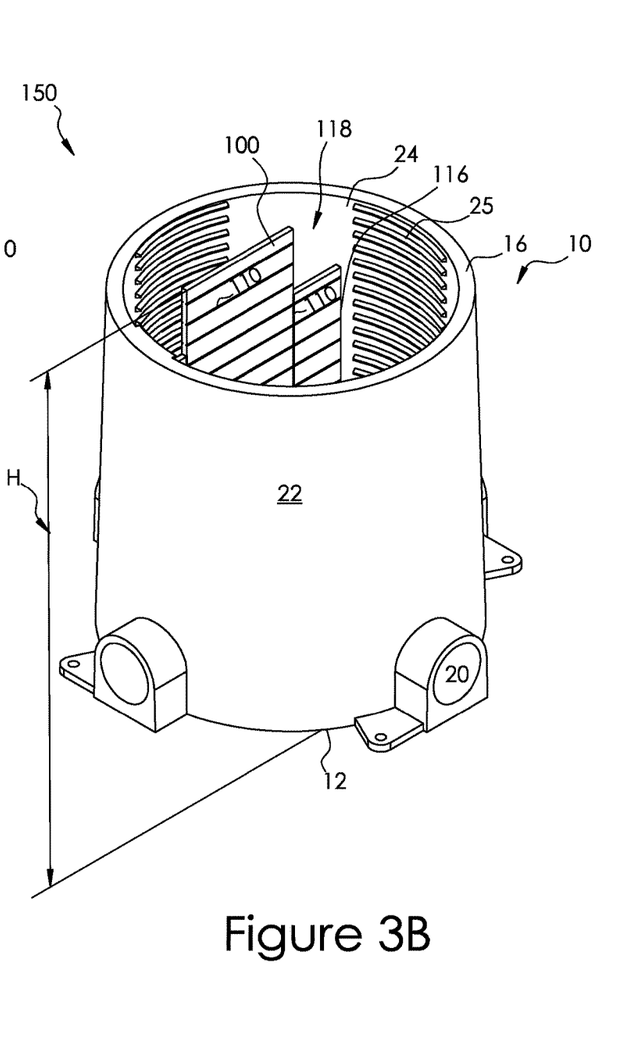

FIGS. 3A and 3B depict another perspective view of the electrical box or housing 10 with the voltage divider 100 disposed therein. FIG. 3A shows the voltage divider 100 at a first height Hd with the height Hd being greater than the height H of the box or housing 10. In order for the voltage divider 100 to be reduced in height and fit within the box or housing 10, a number of detachable bars 120 can be removed by dividing, breaking, or separating the voltage divider 100 along one or more of the score lines 110. In some instances, the voltage divider 100 may be bent or flexed by hand such that the voltage divider bends and then breaks along one or more of the score lines 110. In other instances, the voltage divider 100 may be cut, sawn, such as with scissors, snips, a saw, or other suitable tool along the one or more score lines 110.

In some instances a number of detachable bars 120 may be removed from the top of the voltage divider 100 and be separated in an uneven line, so as to produce, or maintain a notch or recess 118 in the voltage divider 100, such that the upper outer corners 117 of the voltage divider 100 are recessed with respect to vertical edges 116. In yet other instances, a number of detachable bars 120 may be removed from the bottom of the voltage divider 100 and be separated in an even line, so as to produce or maintain a straight line or flat bottom across the voltage divider 100. Whether a portion of the voltage divider 100 is removed from the top or from the bottom, a height of the divider can be reduced from a height Hd greater than the height H of the housing 10 so that the height of the divider is equal to, substantially equal to, or slightly less than the height H of the box 10.

Figure 4B:
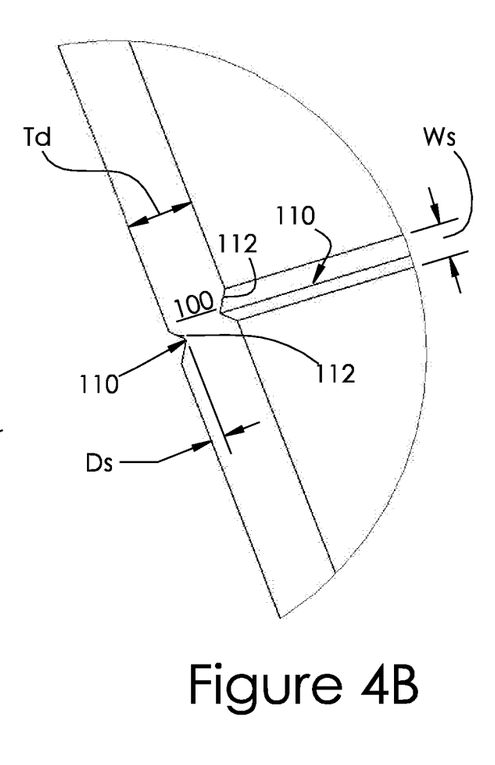

FIGS. 4A and 4B depict various close-up views of the voltage divider 100. More specifically, FIG. 4A shows a perspective view of an upper or top portion of the voltage divider 100 outside of, or away from the housing or box 10. FIG. 4B shows a close-up view of a vertical edge 116 of the voltage divider 100 where a score 110 intersects with the vertical edge 116, as taken at section line 4B. FIG. 4B depicts the scores 110 can be formed with width Ws that may be in a range of 0.2-4 mm, or about 1 mm. The scores 110 can be formed with depth Ds that may be the same or different than the width Ws, and may be in a range of 0.2-4 mm, or about 1 mm. The depth Ds will be less than the thickness Td of the voltage divider 100, and in some instances less than half a thickness of Td. An overall thickness of the voltage divider 100 will vary based on material and application, and the various rules or code requirements with which it must comply. A cross-sectional shape or area of the scores 110 may be triangular, angled, sloped, angular, or semicircular or rounded. By making the score 110 with a straight or angled sidewalls 112 that come to a point, a greater concentration of force may be brought to bear along a single line or fault plane, thereby desirably facilitating breaking of the voltage divider 100 along the desired score 110.

FIG. 5 shows a perspective view of the electrical box or housing 10 with the voltage divider 100 disposed therein and the mounting frame 30 disposed thereover. Continuing from FIG. 5, FIG. 6 shows the assembly of FIG. 5, but with the mounting frame 30 disposed within the electrical box or housing 10. A lower portion of the voltage divider 100 may be disposed between, coupled with, or supported by ribs 25, such as ribs 25 at a base of the inner surface 24 or the bottom surface of the housing or box 10. The voltage divider 100 is also depicted with the upper portion of the voltage divider 100 being positioned within the opening 32 in the mounting frame 36 to form high voltage area 105 and low voltage area 106 within the box or housing 10. As used herein low voltage may mean less than or equal to 12 volts and high voltage means greater than 12 volts. In other instances, high voltage and low voltage may be defined by applicable rules or standards governing a particular application or system use. Low voltage may also refer to, or involve applications with, coaxial cables, phone lines, ethernet cables, switches and signal transmissions for the same, as well as USB devices and wiring for the same.

Figure 7:
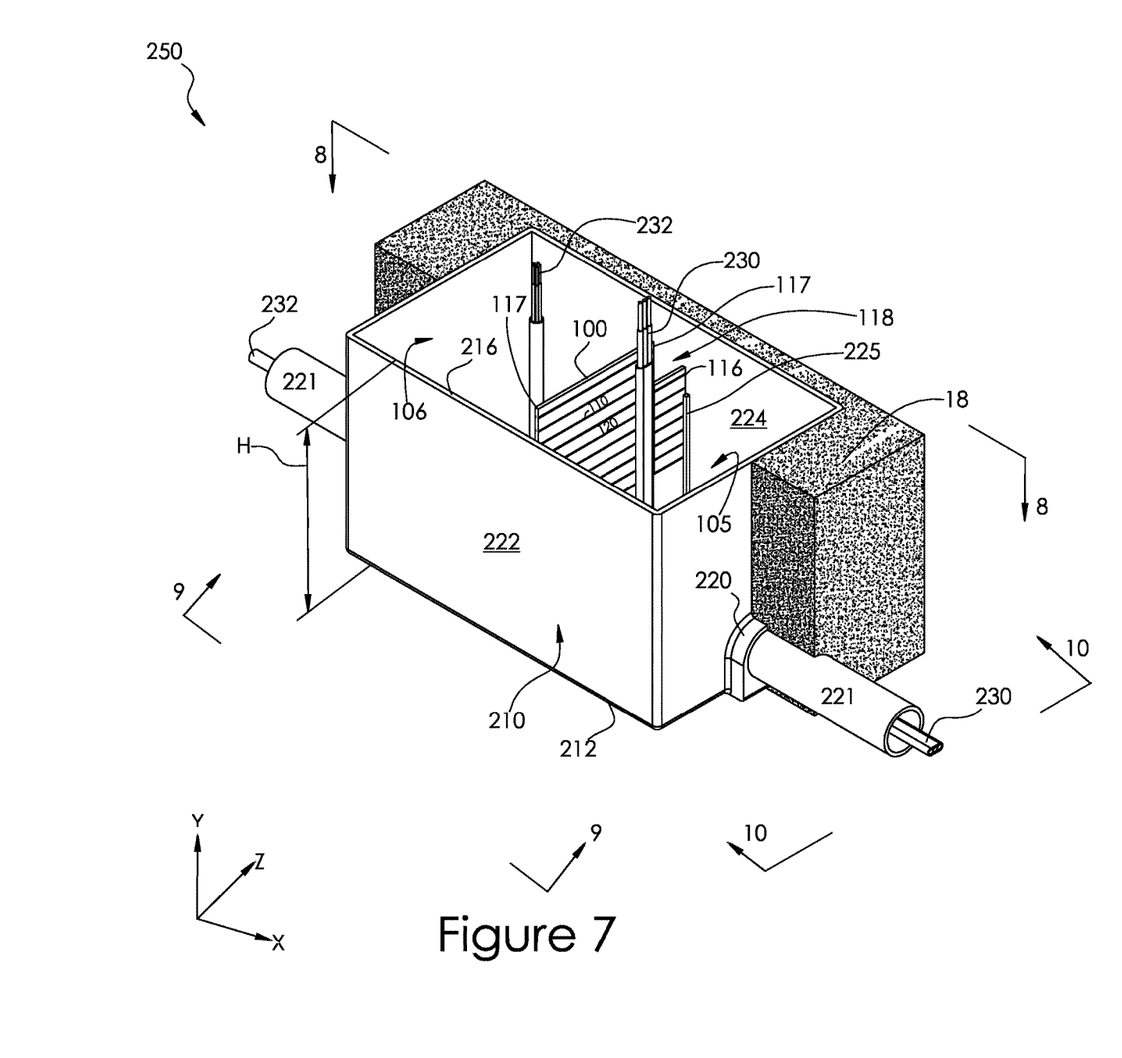
FIG. 7 depicts an exploded perspective view of another electrical box or housing with a voltage divider disposed therein.

FIG. 7 depicts an exploded perspective view of another electrical box or housing 210 with a voltage divider 100 disposed therein. Unless otherwise specified, the box or housing 210 and the assembly 250, together with the elements thereof may be identical, the same, or similar to what was previously described above with respect the box or housing 10 and the assembly 150. For continuity, brevity, and ease of description, the reference numbers for assembly 250 are 100 or 200 numbers higher that what was previously designated for assembly 150 shown in FIGS. 1-6.

The electrical box or assembly comprising an adjustable voltage divider 250 comprises a cylindrical housing, housing, or electrical box 220 comprises lower end, edge, or base 212 and upper end, edge, or top 216 opposite lower end 212. The electrical box 220 also comprises an inner surface 224 and ribs or threads 225 integrally formed on the inner surface 224 of the housing 210. The housing or electrical box 220 comprises an outer surface 222 and an inner surface 224 opposite the outer surface 222. The inner surface 24 comprises a portion which is the bottom inner surface 223, whereat ribs or threads 225 may be disposed so as to form spaces or gaps 226 for receiving the adjustable voltage divider 100. The housing or electrical box 220 also comprises openings or conduit access points 220 and conduit 221 coupled to the conduit access points 220.

The voltage divider plate 100 may be disposed within the housing 10 with vertical edges 116 of the voltage divider plate 100 extending along and held in place between the ribs 225 integrally formed on the inner surface 224 of the housing 210, the voltage divider plate 100 dividing the housing 210 into a high voltage area 105, with high voltage wiring 230 disposed therein, and a low voltage area 106 with low voltage wiring 232 disposed therein. The voltage divider plate 100 may comprise a plurality of horizontal guide lines 110h vertically offset Ov from each other, and a plurality of vertical guide lines 110v horizontally offset Oh from each other and intersecting the plurality of horizontal score lines 110h at intersections 114 5o form detachable bars 120. Upper outer corners 117 of the voltage divider plate 100 may be inwardly disposed from the vertical edges 116 of the voltage divider plate 110.

FIG. 8 depicts plan view of the electrical box or housing 250 as seen in the x-z plane as taken along section line 8 in FIG. 7.

Figure 9:
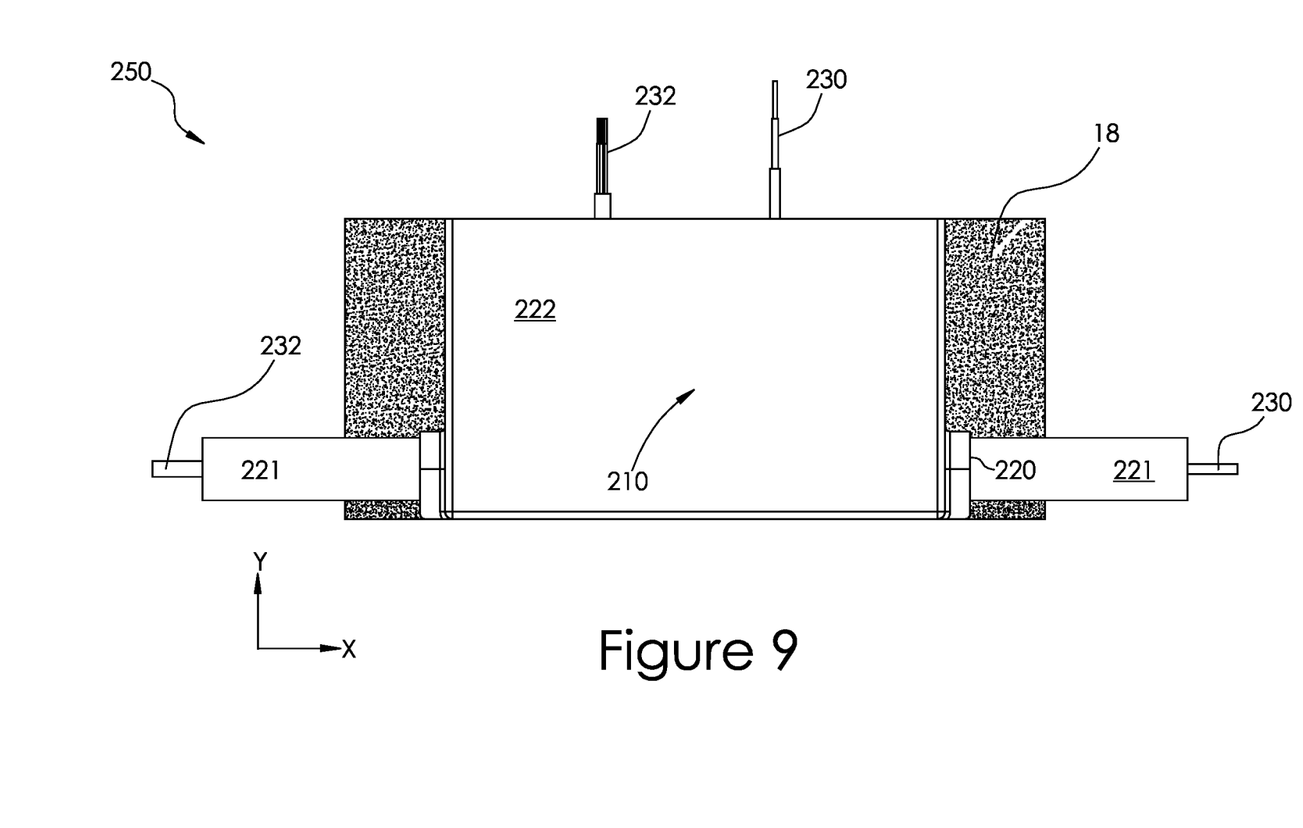
FIG. 9 depicts a profile or side view of the electrical box or housing of FIG. 7 from a first direction.

FIG. 9 depicts a profile or side view of the electrical box or housing 250 as seen in x-y plane as taken along section line 9 in FIG. 7.

Figure 10:
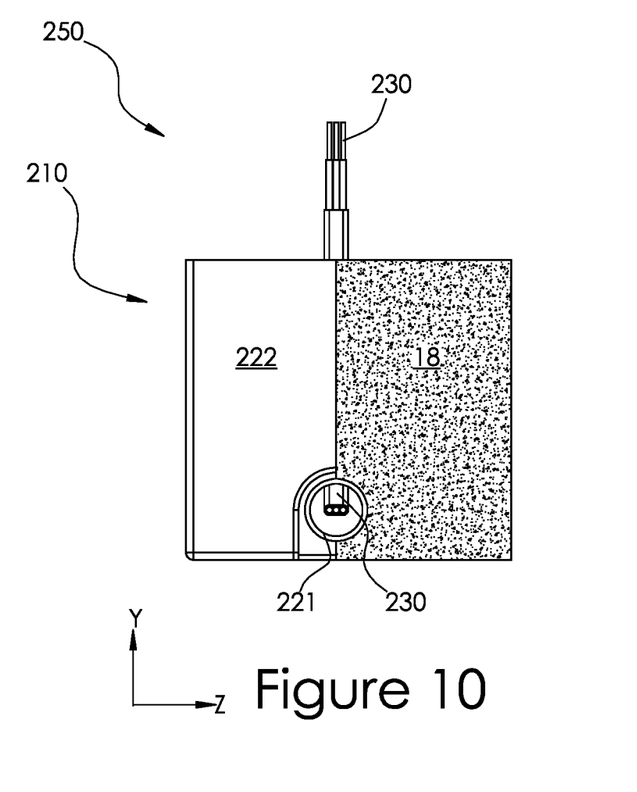
FIG. 10 depicts a profile or side view of the electrical box or housing of FIG. 7 from a second direction perpendicular to the first direction.

FIG. 10 depicts a profile or side view of the electrical box or housing 250 as seen in the y-z plane of FIG. 7. The view shown in FIG. 10 is from a second direction that is perpendicular to the direction of the view in FIG. 9.

It will be understood that implementations of electrical box assemblies comprising an adjustable voltage divider are not limited to the specific assemblies, devices and components disclosed in this document, as virtually any assemblies, devices and components consistent with the intended operation of an electrical box assembly comprising an adjustable voltage divider may be utilized. Accordingly, for example, although particular electrical covers, lids, sleeves, latches, snap-fit couplers, hinges, frames, enclosures, bubble covers, housings, joints, protrusions, ledges, clamps, grooves, ridges, couplers, fasteners, power sockets, and other assemblies, devices and components are disclosed, such may include any shape, size, style, type, model, version, class, measurement, concentration, material, weight, quantity, and/or the like consistent with the intended operation of an electrical box assembly comprising an adjustable voltage divider implementation. Implementations are not limited to uses of any specific assemblies, devices and components; provided that the assemblies, devices and components selected are consistent with the intended operation of an electrical box assembly comprising an adjustable voltage divider.

Accordingly, the components defining any electrical outlet assembly implementations may be formed of any of many different types of materials or combinations thereof that can readily be formed into shaped objects provided that the components selected are consistent with the intended operation of an electrical box assembly comprising an adjustable voltage divider implementation. For example, the components may be formed of: polymers such as thermoplastics (such as ABS, Fluoropolymers, Polyacetal, Polyamide; Polycarbonate, Polyethylene, Polysulfone, and/or the like), thermosets (such as Epoxy, Phenolic Resin, Polyimide, Polyurethane, Silicone, and/or the like), any combination thereof, and/or other like materials; glasses (such as quartz glass), carbon-fiber, aramid-fiber, any combination thereof, and/or other like materials; composites and/or other like materials; metals, such as zinc, magnesium, titanium, copper, lead, iron, steel, carbon steel, alloy steel, tool steel, stainless steel, brass, nickel, tin, antimony, pure aluminum, 1100 aluminum, aluminum alloy, any combination thereof, and/or other like materials; alloys, such as aluminum alloy, titanium alloy, magnesium alloy, copper alloy, any combination thereof, and/or other like materials; any other suitable material; and/or any combination of the foregoing thereof. In instances where a part, component, feature, or element is governed by a standard, rule, code, or other requirement, the part may be made in accordance with, and to comply under such standard, rule, code, or other requirement.

For the exemplary purposes of this disclosure, sizing, dimensions, and angles of implementations of electrical box assemblies comprising an adjustable voltage divider may vary according to different implementations.

Various electrical box assemblies comprising an adjustable voltage divider may be manufactured using conventional procedures as added to and improved upon through the procedures described here. Some components defining electrical box assembly implementations may be manufactured simultaneously and integrally joined with one another, while other components may be purchased pre-manufactured or manufactured separately and then assembled with the integral components. Various implementations may be manufactured using conventional procedures as added to and improved upon through the procedures described here.

Accordingly, manufacture of these components separately or simultaneously may involve extrusion, pultrusion, vacuum forming, injection molding, blow molding, resin transfer molding, casting, forging, cold rolling, milling, drilling, reaming, turning, grinding, stamping, cutting, bending, welding, soldering, hardening, riveting, punching, plating, and/or the like. If any of the components are manufactured separately, they may then be coupled with one another in any manner, such as with adhesive, a weld, a fastener (e.g. a bolt, a nut, a screw, a nail, a rivet, a pin, and/or the like), wiring, any combination thereof, and/or the like for example, depending on, among other considerations, the particular material forming the components.

It will be understood that the electrical box assemblies comprising an adjustable voltage divider are not limited to the specific order of steps as disclosed in this document. Any steps or sequence of steps of the assembly of electrical boxes comprising an adjustable voltage divider indicated herein are given as examples of possible steps or sequence of steps and not as limitations, since various assembly processes and sequences of steps may be used to assemble outlet covers.

The implementations of the electrical box assembly comprising an adjustable voltage divider described are by way of example or explanation and not by way of limitation. Rather, any description relating to the foregoing is for the exemplary purposes of this disclosure, and implementations may also be used with similar results for a variety of other applications requiring a configurable outlet cover.

What is claimed is:

1. A cylindrical electrical box comprising an adjustable voltage divider, comprising:
    a cylindrical housing comprising an inner surface and an outer surface opposite the inner surface, wherein the inner surface of the cylindrical housing comprises a threaded inner surface, the threaded inner surface comprising inclined threads arranged as at least two columns of vertically spaced threads separated by at least two horizontal gaps between the at least two columns of vertically spaced threads;
    a voltage divider plate disposed within the cylindrical housing with vertical edges of the voltage divider plate extending along the at least two horizontal gaps of the inner surface of the cylindrical housing, the voltage divider plate dividing the cylindrical housing into a high voltage area and a low voltage area, the voltage divider plate comprising:
        a plurality of horizontal score lines formed as grooves comprising v-shaped cross-sectional areas, the plurality of horizontal score lines being vertically offset from each other,
        a plurality of vertical score lines formed as grooves comprising v-shaped cross-sectional areas, the plurality of vertical score lines being horizontally offset from each other and intersecting the plurality of horizontal score lines, and
        upper outer corners of the voltage divider plate being inwardly disposed from the vertical edges of the voltage divider plate; and
    a mounting frame rotatably coupled to the threaded inner surface of the housing to adjustably position the mounting frame within the housing, the mounting frame comprising an outer disk comprising an edge mateably coupled with the threaded inner surface and an opening through the outer disk inwardly disposed from the edge of the outer disk, wherein the upper outer corners of the voltage divider plate are disposed through the opening of the mounting frame outer disk.

2. The electrical box comprising an adjustable voltage divider of claim 1, further comprising a floor electrical receptacle coupled to the cylindrical housing.

3. The electrical box comprising an adjustable voltage divider of claim 1, further comprising ribs integrally coupled to the cylindrical housing and vertical edges of the voltage divider plate extending along and held in place between the ribs.

4. The electrical box comprising an adjustable voltage divider of claim 1, wherein the intersecting of the vertical score lines with the horizontal score lines forms three columns of detachable bars, two outer columns of detachable bars with each of the two outer columns comprising a first width and an inner column of detachable bars disposed between the two outer columns, the inner column of detachable bars comprising a second width greater than the first width.

5. The electrical box comprising an adjustable voltage divider of claim 1, wherein the plurality of horizontal score lines and the plurality of vertical score lines are formed as a scoring pattern on a front surface of the voltage divider plate, the scoring pattern also being formed on a back surface of the voltage divider plate opposite the front surface, the scoring pattern on the front surface being aligned with the scoring pattern on the back surface.

6. A rectangular electrical box comprising an adjustable voltage divider, comprising:
    a rectangular housing comprising an inner surface and ribs integrally formed on the inner surface of the rectangular housing; and
    a voltage divider plate disposed within the rectangular housing with vertical edges of the voltage divider plate extending along and held in place between the ribs integrally formed on the inner surface of the rectangular housing, the voltage divider plate dividing the rectangular housing into a high voltage area and a low voltage area, the voltage divider plate comprising:
        a plurality of horizontal score lines formed as grooves, the plurality of horizontal score lines being vertically offset from each other,
        a plurality of vertical score lines formed as grooves, the plurality of vertical score lines being horizontally offset from each other and intersecting the plurality of horizontal score lines, wherein the intersecting of the vertical score lines with the horizontal score lines forms three columns of detachable bars, two outer columns of detachable bars with each of the two outer columns comprising a first width and an inner column of detachable bars disposed between the two outer columns, the inner column of detachable bars comprising a second width greater than the first width, and upper outer corners of the voltage divider plate being inwardly disposed from the vertical edges of the voltage divider plate.

7. The electrical box comprising an adjustable voltage divider of claim 6, wherein the grooves of the horizontal score lines and the vertical score lines comprise a v-shaped cross-sectional area.

8. The electrical box comprising an adjustable voltage divider of claim 6, wherein the plurality of horizontal score lines and the plurality of vertical score lines are formed as a scoring pattern on a first surface of the voltage divider plate, the scoring pattern also being formed on a second surface of the voltage divider plate opposite the first surface, the scoring pattern on the first surface being aligned with the scoring pattern on the second surface.

9. The electrical box comprising an adjustable voltage divider of claim 6, further comprising a floor electrical receptacle coupled to the rectangular housing.

10. An electrical box comprising an adjustable voltage divider, comprising:
a housing comprising an inner surface and ribs integrally formed on the inner surface of the housing;
a voltage divider plate disposed within the housing with vertical edges of the voltage divider plate extending along and held in place between the ribs integrally formed on the inner surface of the housing, the voltage divider plate dividing the housing into a high voltage area and a low voltage area, the voltage divider plate comprising:
a plurality of horizontal guide lines vertically offset from each other, and
a plurality of vertical guide lines horizontally offset from each other and intersecting the plurality of horizontal guide lines, wherein the intersecting of the vertical guide lines with the horizontal guide lines forms three columns of detachable bars, two outer columns of detachable bars with each of the two outer columns comprising a first width and an inner column of detachable bars disposed between the two outer columns, the inner column of detachable bars comprising a second width greater than the first width; and
upper outer corners of the voltage divider plate being inwardly disposed from the vertical edges of the voltage divider plate.

11. The electrical box comprising an adjustable voltage divider of claim 10, wherein the horizontal guide lines and the vertical guide lines are formed as score lines comprising a groove formed in the voltage divider plate configured to facilitate breaking of the voltage divider plate along the score lines.

12. The electrical box comprising an adjustable voltage divider of claim 11, wherein the score lines are formed comprising a v-shaped cross-sectional area.

13. The electrical box comprising an adjustable voltage divider of claim 11, wherein the plurality of horizontal score lines and the plurality of vertical score lines are formed as a scoring pattern on a first surface of the voltage divider plate, the scoring pattern also being formed on a second surface of the voltage divider plate opposite the first surface, the scoring pattern on the first surface being aligned with the scoring pattern on the second surface.

14. The electrical box comprising an adjustable voltage divider of claim 10, further comprising a floor electrical receptacle coupled to the housing.

\* \* \* \* \*